United States Patent
Al-Kiswany et al.

(10) Patent No.: US 12,505,233 B2
(45) Date of Patent: Dec. 23, 2025

(54) SYSTEMS AND METHODS OF SECURE DEDUPLICATION OF ENCRYPTED CONTENT

(71) Applicant: Acronis International GmbH, Schaffhausen (CH)

(72) Inventors: Samer Al-Kiswany, Waterloo (CA); Sreeharsha Udayashankar, Waterloo (CA); Abdelrahman Baba, Waterloo (CA); Serg Bell, Costa de Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 234 days.

(21) Appl. No.: 18/344,326

(22) Filed: Jun. 29, 2023

(65) Prior Publication Data

US 2025/0005171 A1    Jan. 2, 2025

(51) Int. Cl.
*G06F 21/60* (2013.01)
*G06F 21/62* (2013.01)

(52) U.S. Cl.
CPC ........ *G06F 21/602* (2013.01); *G06F 21/6209* (2013.01)

(58) Field of Classification Search
CPC .................. G06F 21/602; G06F 21/6209
See application file for complete search history.

(56) References Cited

U.S. PATENT DOCUMENTS

| | | |
|---|---|---|
| 9,336,092 B1 | 5/2016 | Li |
| 10,409,688 B2 | 9/2019 | Tormasov |
| 10,592,348 B2 | 3/2020 | Pogosyan et al. |
| 10,678,654 B2 | 6/2020 | Pogosyan et al. |
| 11,184,168 B2 | 11/2021 | Bohli et al. |
| 2013/0166510 A1* | 6/2013 | Augenstein ........... H04L 9/3247 707/640 |
| 2019/0103970 A1* | 4/2019 | Koszek ............... H04L 63/0428 |
| 2022/0318415 A1 | 10/2022 | Fu et al. |

FOREIGN PATENT DOCUMENTS

CN    114760061 A    7/2022

* cited by examiner

*Primary Examiner* — Ayoub Alata
(74) *Attorney, Agent, or Firm* — ESPE Legal Consultancy FZ-LLC (57) ABSTRACT

Systems and methods for secure deduplication of encrypted content. A system generally includes a client, a key server, a fingerprint index, and a storage service. The client can perform chunking of a file, hashing of chunks to generate tags, and encryption of chunks using a salted key from the key server. The fingerprint index checks for duplicate ciphertexts using the tags. The storage service saves non-duplicate ciphertext.

20 Claims, 9 Drawing Sheets

SYSTEMS AND METHODS OF SECURE DEDUPLICATION OF ENCRYPTED CONTENT

TECHNICAL FIELD

Embodiments relate generally to encrypted content. More particularly, embodiments relate to securely deduplicating encrypted content.

BACKGROUND

Server-side deduplication is widely employed by storage providers to conserve storage space. A large amount of data stored by storage providers is duplicated such that multiple copies of the same data are stored for different users. Identifying this duplicated data and storing a single copy instead of multiple copies of the same data can result in savings of up to 90% in disk space, depending on the data stored. The large storage cost benefit associated with deduplication is the primary reason for the widespread adoption of data deduplication across storage providers.

However, current solutions for deduplication cannot operate on data that is encrypted. Data that is encrypted is converted from plaintext to ciphertext using an encryption key. Without the appropriate decryption key, a server cannot convert the ciphertext back to plaintext to determine which encrypted data is duplicate. For example, a user uploading encrypted data will encrypt the data using the user's own keys that are not available to the storage provider. The storage provider therefore cannot perform the identification operation and will thus store data that is the same but has been encrypted by two different users.

Users and storage providers are faced with a trade-off. Data can be stored unencrypted but deduplicated by storage providers to save on storage space, but this leaves users' data vulnerable. Or data is stored encrypted but not deduplicated by storage providers, which does not save on storage space but protects users' data).

Therefore, there is a need for server-side deduplication for encrypted data.

SUMMARY

Embodiments described or otherwise contemplated herein substantially meet the aforementioned needs of the industry. Embodiments described herein include systems and methods of secure deduplication of encrypted content. Embodiments improve the security guarantees provided to end users by storage providers, in addition to reducing the storage space required for encrypted data.

In an embodiment, a method for secure deduplication of a file on a storage comprises dividing the file into a plurality of chunks; hashing each of the plurality of chunks to obtain a plurality of unsalted keys, wherein each one of the plurality of unsalted keys is associated with one of the plurality of chunks; salting the plurality of unsalted keys to generate a plurality of salted keys; encrypting each of the plurality of chunks with the plurality of salted keys to generate a plurality of ciphertexts; hashing each of the plurality of ciphertexts to generate a plurality of tags; validating that at least one of the plurality of ciphertexts is already present on the storage using the plurality of tags; verifying each tag in the subset of the plurality of tags that are not already present on the storage matches the corresponding ciphertext by hashing each of the subset of the plurality of ciphertexts that are not already present on the storage; and storing the subset of the plurality of tags that are not already present on the storage and the subset of the plurality of ciphertexts that are not already present on the storage.

In one aspect, the storing further comprises writing a recipe file as a sequence of tags and salted keys.

In one aspect, the storing further comprises encrypting the recipe file using public key-private key encryption; and storing the encrypted recipe file on the storage.

In one aspect, the method further comprises obscuring whether at least one of the subset of the plurality of ciphertexts that are not already present on the storage is already on the storage.

In one aspect, the obscuring comprises generating a random number for each of the subset of the plurality of ciphertexts, each random number being associated with a threshold; and storing the random number with each of the subset of the plurality of ciphertexts.

In one aspect, the method further comprises determining if a certain ciphertext of one of the subset of the plurality of ciphertexts is uploaded; incrementing the random number for the certain ciphertext; and returning an obscured indication of whether the certain ciphertext is already stored based on the threshold.

In one aspect, a client encrypting each of the plurality of chunks does not know the salting to generate the plurality of salted keys.

In one aspect, the plurality of salted keys are generated by a program executing on a secure coprocessor.

In one aspect, the method further comprises decrypting the encrypted recipe file using public key-private key encryption; retrieving the plurality of ciphertexts using the sequence of tags from the recipe file; decrypting the plurality of ciphertexts using the salted keys from the recipe file to obtain the plurality of chunks; and rearranging the plurality of chunks to recreate the file.

In an embodiment, a system for secure deduplication of a file on a storage comprises a client device including at least one processor and memory operably coupled to the at least one processor, and instructions that, when executed on the at least one processor, cause the at least one processor to implement: a chunking engine configured to divide the file into a plurality of chunks, a hashing engine configured to hash each of the plurality of chunks to obtain a plurality of unsalted keys, wherein each one of the plurality of unsalted keys is associated with one of the plurality of chunks, an encryption engine configured to encrypt each of the plurality of chunks with a plurality of salted keys to generate a plurality of ciphertexts, wherein the hashing engine is further configured to hash each of the plurality of ciphertexts to generate a plurality of tags; a key server including a salting engine configured to salt the plurality of unsalted keys to generate the plurality of salted keys; a fingerprint index including a duplicate identification engine configured to validate that at least one of the plurality of ciphertexts is already present on the storage using the plurality of tags; and a storage service including: a ciphertext verification engine configured to verify each tag in the subset of the plurality of tags that are not already present on the storage matches the corresponding ciphertext by hashing each of the subset of the plurality of ciphertexts that are not already present on the storage, and a storage engine configured to store the subset of the plurality of tags that are not already present on the storage and the subset of the plurality of ciphertexts that are not already present on the storage.

In one aspect, the client device further includes an input/output engine configured to write a recipe file as a sequence of tags and salted keys.

In one aspect, the encryption engine is further configured to encrypt the recipe file using public key-private key encryption, and wherein the storage engine is further configured to store the encrypted recipe file on the storage.

In one aspect, the system further comprises a rate limiting engine configured to: obscure whether at least one of the subset of the plurality of ciphertexts that are not already present on the storage is already on the storage.

In one aspect, the rate limiting engine is configured to obscure whether at least one of the subset of the plurality of ciphertexts that are not already present on the storage is already on the storage including by: generating a random number for each of the subset of the plurality of ciphertexts, each random number being associated with a threshold; and storing the random number with each of the subset of the plurality of ciphertexts.

In one aspect, the rate limiting engine is further configured to obscure whether at least one of the subset of the plurality of ciphertexts that are not already present on the storage is already on the storage including by: determining if a certain ciphertext of one of the subset of the plurality of ciphertexts is uploaded; incrementing the random number for the certain ciphertext; and returning an obscured indication of whether the certain ciphertext is already stored based on the threshold.

In one aspect, the client device does not know the salting to generate the plurality of salted keys.

In one aspect, the salting engine is configured to generate the plurality of salted keys by a program executing on a secure coprocessor.

In one aspect, the encryption engine is further configured to: decrypt the encrypted recipe file using public key-private key encryption; retrieve the plurality of ciphertexts using the sequence of tags from the recipe file; decrypt the plurality of ciphertexts using the salted keys from the recipe file to obtain the plurality of chunks; and rearrange the plurality of chunks to recreate the file.

In an embodiment, a non-transitory computer-readable medium having stored thereon an encrypted recipe file in a data structure includes: a plurality of tags, wherein each of the plurality of tags corresponds to a ciphertext chunk of a data file, and wherein the plurality of tags includes all of the ciphertext chunks of the data file; and a plurality of salted keys, wherein each of the plurality of salted keys is associated with one of the plurality of tags for decryption of the corresponding ciphertext chunk.

In one aspect, the data structure is a linear data structure, and wherein the plurality of tags and the plurality of salted keys are stored in a sequence corresponding to an assembly order of the data file.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Embodiments described herein may be more completely understood in consideration of the following detailed description in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments described herein leverage Message-Locked Encryption (MLE) in order to make encrypted data deduplicatable. An MLE scheme is a symmetric encryption scheme in which the key used for encryption and decryption is itself derived from the message. Embodiments described herein also employ various countermeasures against the security threats MLE is inherently vulnerable to, including hardware-based memory encryption, trust domains, and randomization techniques.

In one example, MLE can be attacked using a remaining information attack. Consider a data upload that has a well-known template like a pay slip. If an attacker knows some of the information (but not all), the attacker can partially complete the form and then try other data for the remaining information using brute force. In the pay-slip example, fields can include an employee name and salary associated with the employee name. If an attacker knows the employee name, the attacker can fill in name information, then try different salaries because the attacker knows the format of the pay slip. The attacker will know when the salary information is correct when the name and salary are uploaded to the server to check if that pay-slip file exists and the server indicates that it has a copy of that file. The fundamental problem in such an attack is that the variability of data is small. Embodiments described herein therefore provide solutions to MLE attacks.

Figure 1:
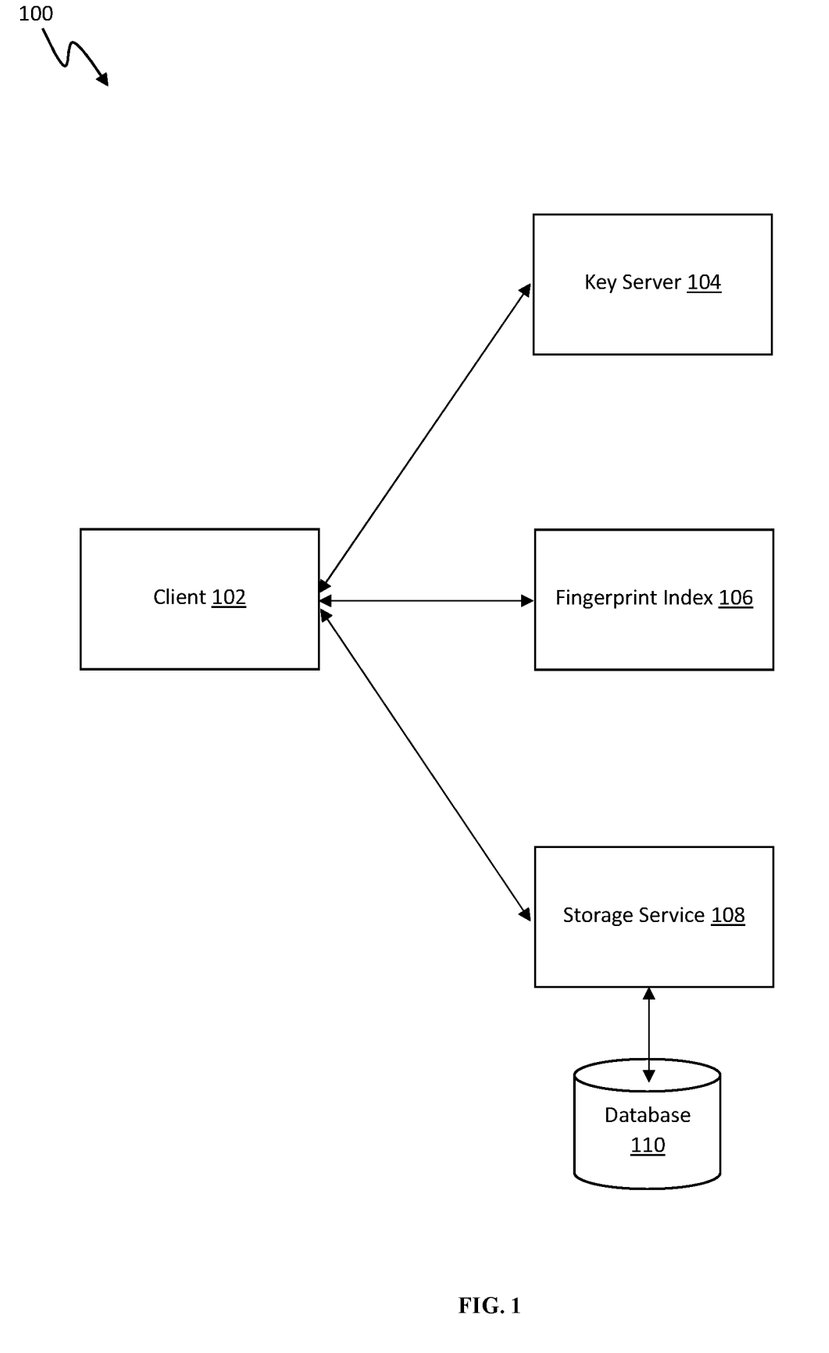
FIG. 1 is a block diagram of a system for deduplicating encrypted data, according to an embodiment.

Referring to FIG. 1, a block diagram of a system 100 for deduplicating encrypted data is depicted according to an embodiment. System 100 generally comprises a client 102, a key server 104, a fingerprint index 106, and a storage service 108.

System 100 includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In an embodiment, client 102 comprises a computing device operated by a user. For example, client 102 can be a desktop computer, laptop computer, tablet, smartphone, or other computing device. Accordingly, client 102 includes data to be securely stored, for example, by secure deduplication operations described herein, including by operations performed client 102 itself, key server 104, fingerprint index 106, and storage service 108. In general, use cases for client 102 storing data include backup (e.g. backing up all or selected client 102 files), and general file storage (e.g. a user desiring a certain file be stored).

Accordingly, client 102 is operably coupled to key server 104, fingerprint index 106, and storage service 108 via one or more communication channels. The communication channels can be wired or wireless and be implemented according to any suitable protocol, such as USB, BLUETOOTH, Internet Protocol (IP), Wi-Fi, or any other appropriate format for the respective data connection.

Figure 2:
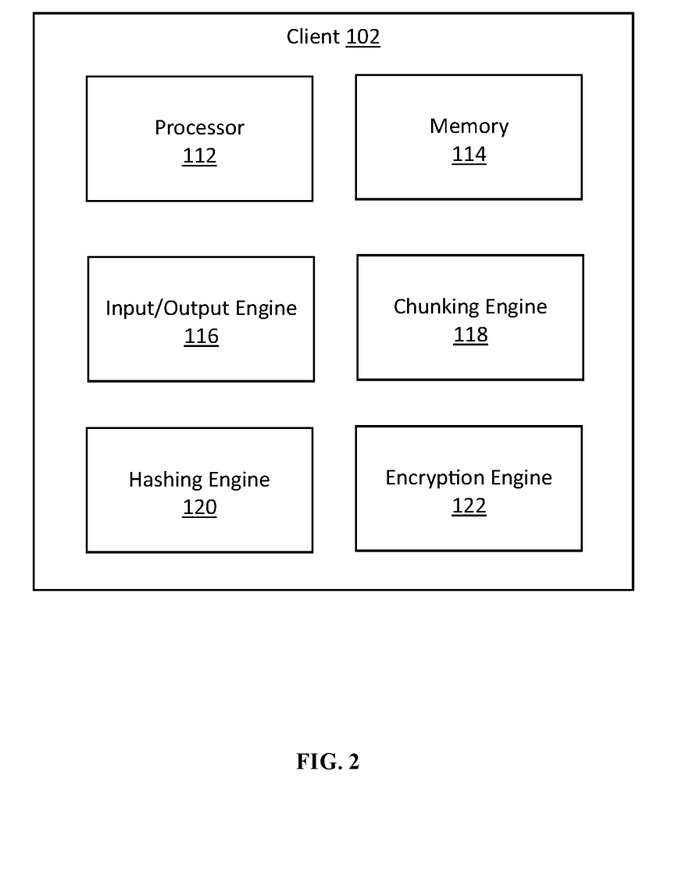
FIG. 2 is a block diagram of a client of a system for deduplicating encrypted data, according to an embodiment.

Referring further to FIG. 2, a block diagram of client 102 is depicted, according to an embodiment. Client 102 generally comprises a processor 112, a memory 114, an input/output engine 116, a chunking engine 118, a hashing engine 120, and an encryption engine 122. In an embodiment, the respective engines of client 102 can operate as a daemon running on client 102.

Processor 112 can be a programmable device that accepts digital data as input, is configured to process the input according to instructions or algorithms, and provides results as outputs. In an embodiment, processor 112 can be a central processing unit (CPU) configured to carry out the instructions of a computer program. Processor 112 is therefore configured to perform at least basic arithmetic, logical, and input/output operations.

Memory 114 can comprise volatile or non-volatile memory as required by the coupled processor 406 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, or optical disc storage, for example.

Input/output engine 116 is configured to communicate with the other components of system 100, for example, over the one or more communication channels. In an embodiment, input/output engine 116 can comprise a network card including hardware and software to send data to the network and receive data from the network.

Client 102 is configured to perform chunking of one or more files using chunking engine 118. For example, chunking engine 118 is configured to perform chunking to split a file into smaller pieces (chunks) according to a chunking algorithm. In embodiments, when deduplicating large content (e.g. a large video or other large document, typically larger than 4-8 KB), it is desirable to split the content into smaller pieces rather than upload the entire document in a single chunk. Chunking engine 118 can split the file into variable-sized chunks. In an embodiment, chunking can be implemented by a Content-Defined Chunking (CDC) algorithm including by fixed-size chunking, asymmetric extremum (AE) chunking, and/or MaxP chunking.

Client 102 is further configured to perform hashing of chunks using hashing engine 120. For example, hashing engine 120 is configured to hash the chunks to obtain an unsalted key K. In an embodiment, hashing of the chunks is performed as one-way collision resistant hashing.

Client 102 is further configured to perform encryption of plaintext to generate ciphertext and tags using encryption engine 122. Once client 102 has a salted key $K_{salted}$ (e.g. from key server 104 via input/output engine 116), encryption engine 122 can encrypt each chunk using the salted key to obtain ciphertext pieces. Notably, the salted keys are not known to storage service 108. Further, encryption engine 122 can hash the ciphertext pieces to get tags associated with the ciphertext pieces. In an embodiment, hashing of the ciphertext pieces is performed as one-way collision resistant hashing.

Though not depicted for ease of illustration, system 100 can include a plurality of clients 102 that are each likewise operably coupled to key server 104, fingerprint index 106, and storage service 108.

Figure 3:
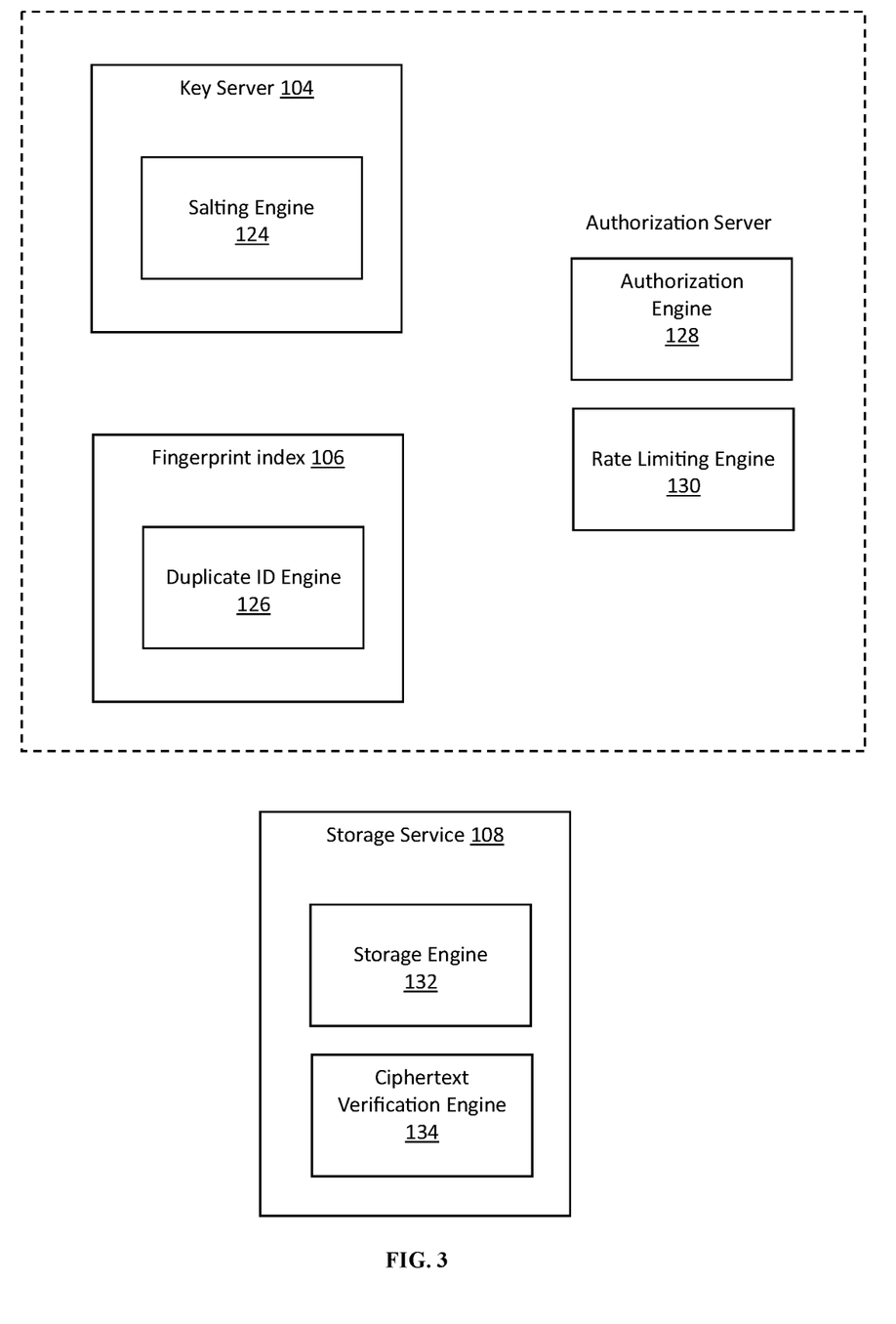
FIG. 3 is a block diagram of server-side components of a system for deduplicating encrypted data, according to an embodiment.

Key server 104 comprises a computing device configured to salt encryption keys. Referring further to FIG. 3, a block diagram of server-side components of a system for deduplicating encrypted data are depicted, according to an embodiment. In an embodiment, key server 104 comprises a salting engine 124. Key server 104 can comprise one or more processors, operably coupled memory, and an input/output engine for interfacing with the network that are substantially similar to those described with respect to client 102 and are not re-described here.

Salting engine 124 is configured with a salting algorithm to perform the addition of a salt value onto any key generated by client 102 before the key is used for encryption. For example, the salt can comprise random data (e.g. a password or passphrase) that is used as an additional input to a one-way function (e.g. XOR) that hashes data to return the salted key $K_{salted}$. In embodiments, client 102 does not know the salt value. Because client 102 does not know the key, this aids in preventing remaining information attacks. In embodiments, key server 104 is deployed on a secure enclave.

In an embodiment, key server 104 is not a networked server. Rather, salting engine 124 is implemented by hardware-based memory encryption that isolates specific application code and data in memory; for example, on client 102. In one example, INTEL SGX can be utilized to allow user-level code to allocate private regions of memory which are designed to be protected from processes running at higher privilege levels. More particularly, SGX operates on the processor on Intel chips that client 102 cannot access. Accordingly client 102 does not itself know the salt, but provides the salted key.

Fingerprint index 106 comprises a computing device configured to identify existing data chunks. In an embodiment, fingerprint index 106 comprises a duplicate identification engine 126. The fingerprint index 106 can comprise one or more processors, operably coupled memory, and an input/output engine for interfacing with the network that are substantially similar to those described with respect to client 102 and are not re-described here. Duplicate identification engine 126 is configured to compare one or more chunks of data to other data chunks to identify duplicates. In embodiments, fingerprint index 106 therefore includes the tags for ciphertexts known to system 100. Tag correctness requires that tags corresponding to Data1, Data2 are likely to be the same if and only if Data1, Data2 are the same.

In an embodiment, fingerprint index 106 is organized as a hash map. A hash map is a data structure that implements an associative array or dictionary and that maps keys to values. In other embodiments, a distributed index can further be used for large files.

In embodiments, one or more of key server 104 or fingerprint index 106 can act as an authorization server or are co-located with an authorization server. For example, an authorization server can include authorization engine 128. In such embodiments, the authorization engine 128 can authorize client requests before requests are processed by other system 100 components. In embodiments, if client 102 is not implementing SGX, authorization engine 128 can itself implement SGX over the network such that the authorization server generates the salt on its processor and provides the salt over the network. The authorization server can further include a rate limiting engine 130 configured to enforce client request rate limiting, as will be described herein. In other embodiments, a separate networked authorization server can implement authorization engine 128 to authorize client requests and rate limiting engine 130 to enforce rate limiting. In another embodiment, rate limiting engine 130 can be implemented on storage service 108.

Storage service 108 comprises a computing device configured to store encrypted client 102 data. In an embodiment, storage service 106 comprises a storage engine 132 and a ciphertext verification engine 134. Storage service 106 can comprise one or more processors, operably coupled memory, and an input/output engine for interfacing with the network that are substantially similar to those described with respect to client 102 and are not re-described here. Storage engine 132 is configured to interface with a database (e.g. database 110) to store and retrieve data. Ciphertext verification engine 134 is configured to perform ciphertext tag verification. For example, ciphertext verification engine 134 can implement a hashing algorithm that was executed by client 102 to determine that tags match the respective ciphertext. In embodiments, storage service 108 is further configured for MLE and Public-Key/Private-Key encryption, as described herein.

In an embodiment, storage service 108 is operably coupled to a data storage such as database 110. Database 110 can be a general-purpose database management storage system (DBMS) or relational DBMS as implemented by, for example, Oracle, IBM DB2, Microsoft SQL Server, PostgreSQL, MySQL, SQLite, Linux, or Unix solutions. Database 110 is therefore configured to store the deduplicated encrypted data for client 102.

Key server 104, fingerprint index 106, and storage service 108 are depicted as separate components in FIG. 1. In embodiments, each of key server 104, fingerprint index 106, and storage service 108 can be implemented as separate networked computing device. In other embodiments, portions or all of the functionality of respective engines of key server 104, fingerprint index 106, and storage service 108 can be implemented on the same or overlapping computing devices, for example, as illustrated in FIG. 3.

Figure 4A:
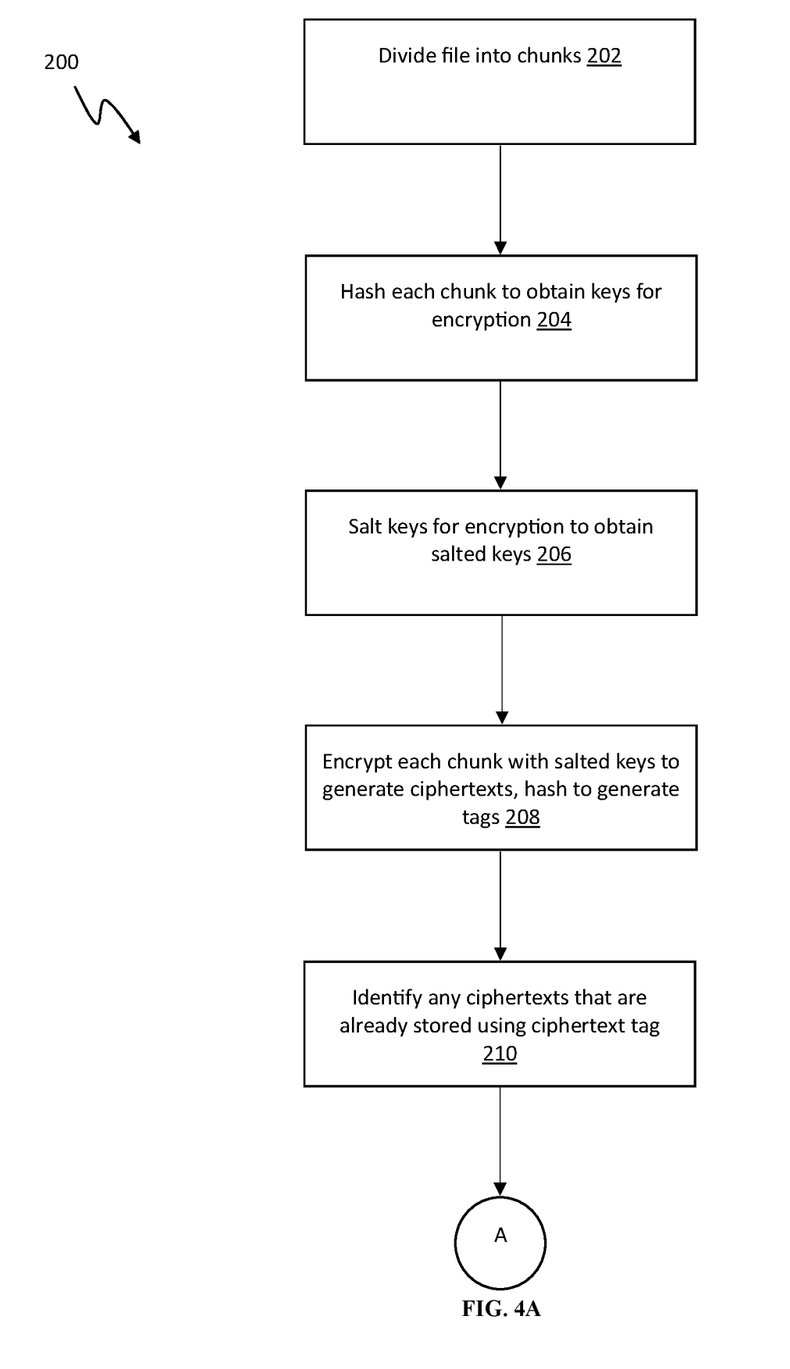
FIGS. 4A-4B are a flowchart of a method for storing deduplicated encrypted data, according to an embodiment.
Figure 4B:
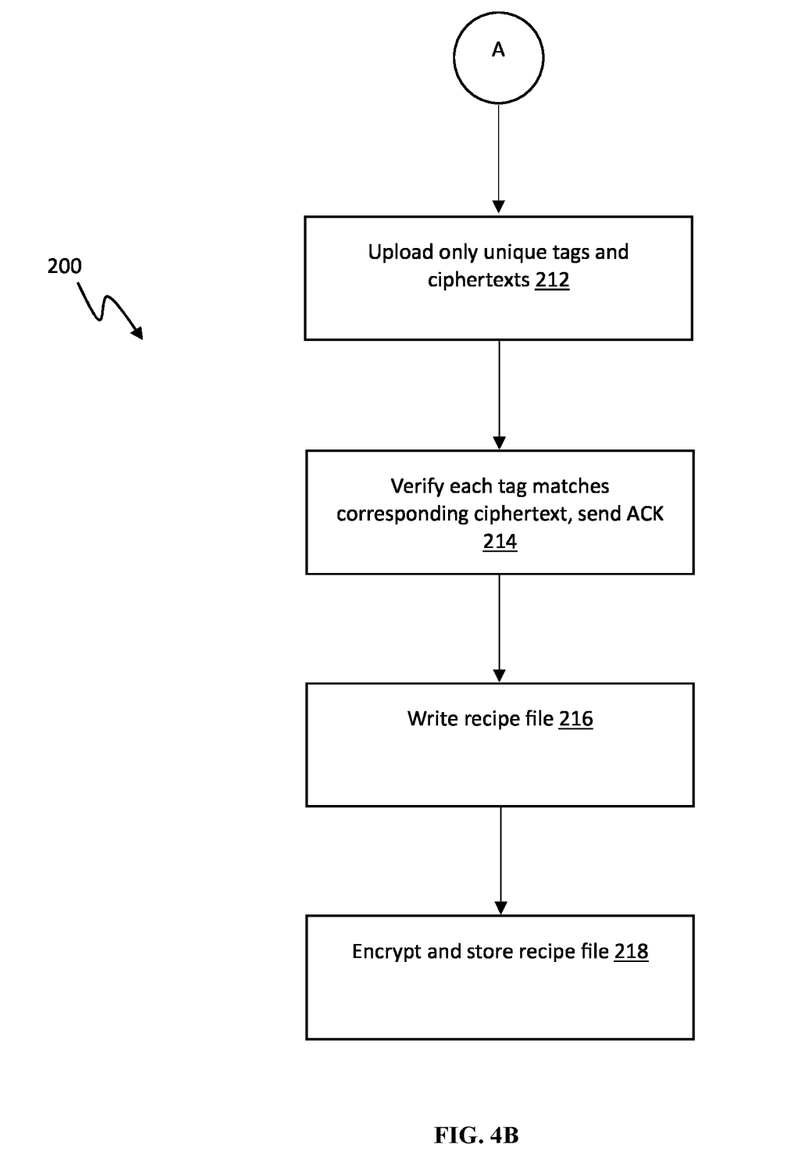
Figure 5:
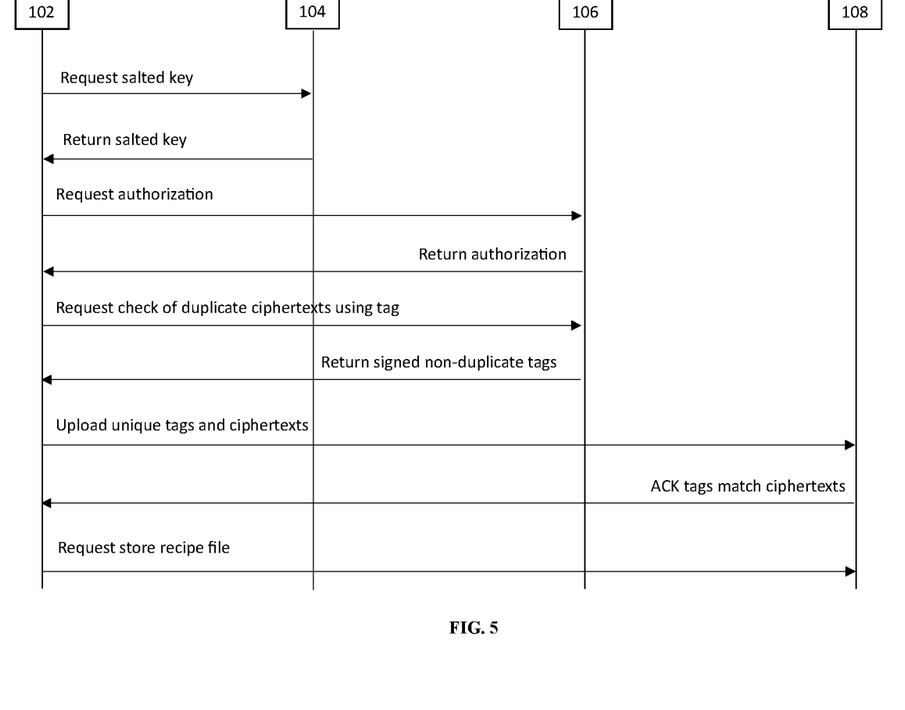
FIG. 5 is a block diagram of a communication sequence for storing deduplicated encrypted data with the system of FIG. 1, according to an embodiment.

In operation, and referring further to FIGS. 4A-4B in which a flowchart of a method 200 for storing deduplicated encrypted data with the system of FIG. 1 are depicted, and FIG. 5, in which a block diagram of a communication sequence for storing deduplicated encrypted data with the system of FIG. 1 is depicted, data from client 102 is stored encrypted and deduplicated on database 110.

At 202, client 102 identifies a file to be stored by storage service 106 and divides the file into a plurality of chunks. For example, client 102 can utilize chunking engine 118 to chunk the file. In an embodiment, at 202, client 102 can utilize chunking engine 118 to chunk multiple files for storage.

At 204, client 102 hashes each of the plurality of chunks to obtain an initial key for encryption. For example, client 102 can utilize hashing engine 120 using a one-way collision resistant hash to obtain unsalted key: K←Hash (chunk).

At 206, and referring also to FIG. 5, client 102 contacts key server 104 (e.g. using input/output engine 116) and requests that key server 104 salt the unsalted key K. In embodiments, client 102 contacts key server 104 via an oblivious pseudo random function (OPRF) or directly if hardware-based memory encryption such as INTEL Software Guard Extensions (SGX) is used to mix in the salt with each key. Key server 104 salts the unsalted key using salting engine 124 to generate the salted key $K_{salted}$ and returns the salted key $K_{salted}$ to client 102: Ksalted←Fsalt(K, salt).

At 208, client 102 encrypts each chunk using encryption engine 122 with salted key $K_{salted}$ to generate a plurality of ciphertext pieces: C←E (chunk, Ksalted). Further at 208, client 102 hashes the plurality of ciphertext pieces using hashing engine 120 to generate a tag for each ciphertext piece: T←H(C).

Further, referring again to FIG. 5, client 102 can request authorization (e.g. as shown, with communication via fingerprint index 106 acting as an authorization server) to gain approval to communicate with the other components of system 100. As will be described further, the authorization server can check rate limits and generate an authorization signature: Signature $S_{Auth}=E_{PrivKeAS}$(Hash(Tags)). Fingerprint index 106 can return authorization approval to client 106. Communications of client 102 authorization request and the authorization server's approval can be made on a secure channel.

At 210, client 102 checks with fingerprint index 106 to identify any ciphertexts that are already stored in system 100 using each ciphertext's tag. Accordingly, client 102 sends all tags to fingerprint index 106. Fingerprint index 106 receives the tags and utilizes duplicate identification engine 126 using each ciphertext's tag as input to check for other same tags associated with ciphertexts stored in database 110. Fingerprint index 106 returns the non-duplicate tags to client 102: Signature $S_{FP}=E_{PrivKeyFP}$(Hash(Non-Dup Tags). Client 102 sending all tags to the fingerprint index 106 and fingerprint index 106 returning the non-duplicate tags can be made on a secure channel.

At 212, client 102 contacts storage service 108 and uploads the non-duplicate tags and corresponding ciphertexts to storage service 108.

At 214, storage service 108 verifies that each tag matches the corresponding ciphertext. For example, storage service 108 can utilize ciphertext verification engine 134 to verify that each tag sent by client 102 matches the corresponding ciphertext sent by client 102. Accordingly, storage service 108 verifies fingerprint index 106 signature $S_{FP}$ for every tag. If verification is successful, storage service 108 stores the non-duplicate tags and corresponding ciphertexts and sends back an acknowledgement (ACK) to client 102.

Figure 6:
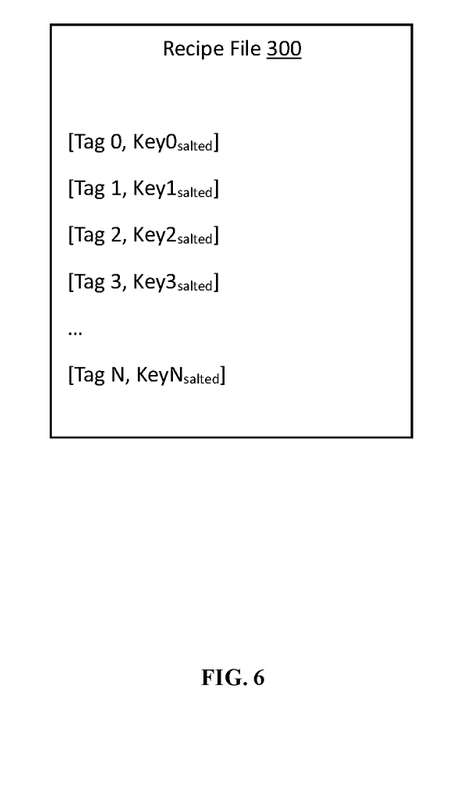
FIG. 6 is a block diagram of a recipe file, according to an embodiment.

At 216, client 102 writes the sequence of tags and keys required to reconstruct each file into a recipe file. For example, input/output engine 116 is configured to write a recipe file. Referring further to FIG. 6, a block diagram of a recipe file 300 is depicted, according to an embodiment.

Recipe file 300 comprises a data structure such as a linear data structure in which a plurality of tags and a plurality of respective salted keys are stored in order. For example, recipe file 300 can be a linear data structure such as an array, a linked list, a stack, a queue, etc. The sequence of tags and salted keys in order allows for reconstruction of the file.

Only the non-duplicate ciphertexts were uploaded to storage service 108 (e.g. at 212). Accordingly, some chunks of the file were stored, and some were already stored (e.g. the duplicate chunks). Recipe file 300 thereby provides a map to recreate all chunks of the file with instructions that chunk 1 has tag 1, chunk 2 has tag 2, etc., and the chunks are to be assembled in the listed order, as will be described with respect to FIG. 8.

At 218, client 102 encrypts the recipe file via public key/private key encryption and requests that storage service 108 store the encrypted recipe file. Accordingly, each recipe file is encrypted using the client's public key for decryption only with the client's private key. Notably, the recipe file includes the salted keys, so public key cryptography is relied on to protect the recipe file and the salted keys. Storage service 108 receives the encrypted recipe file and stores the encrypted recipe file on database 110 using storage engine 132.

In embodiments, key management associated with recipe file 300 can be coordinated by a securely deployed key management service instead of client 102. For example, client 102 can be operably coupled to a key management service which handles operations with the recipe file instead of client 102.

Figure 7:
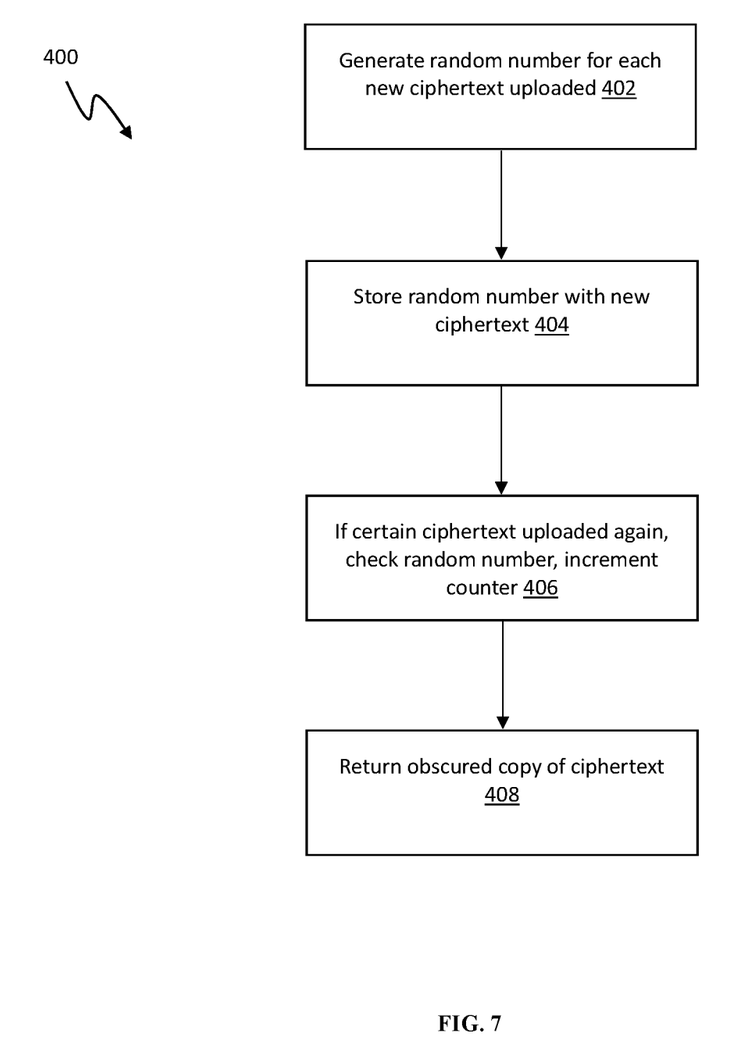
FIG. 7 is a flowchart of a method for rate limiting in storing deduplicated encrypted data, according to an embodiment.

Referring to FIG. 7, a flowchart of a method 400 for rate limiting in storing deduplicated encrypted data is depicted, according to an embodiment. Continuing the remaining information attack pay slip example discussed above, consider the circumstances in which one employee's account is compromised. An attacker will therefore know the company's private key and have access to recipe files and the salted keys included in the recipe files. Thus, an attacker can still use SGX to salt additional keys to figure out by brute force of hacking a legit machine (e.g. to find salaries)

Embodiments described herein provide randomization techniques to further prevent against attack, such as method 400. Method 400 for rate limiting can be implemented by rate limiting engine 130 on a server computing device.

At 402, a random number is generated for every new ciphertext uploaded. In one example, rate limiting engine 130 can generate a random number between 2-6 for a ciphertext uploaded by client 102. Further at 402, a threshold is defined for each new ciphertext. In the example of a random number between 2-6, the threshold can be 6.

At 404, the random number is stored with the new ciphertext. For example, rate limiting engine 130 can be operably coupled with storage service 108 to communicate a request for storage of the random number in database 110 as associated with the stored ciphertext.

At 406, if a certain ciphertext is uploaded again by a new client, the random number is checked, and a second copy of the ciphertext is uploaded with a counter incrementing the random number. For example, rate limiting engine 130 can evaluate the random number for the certain ciphertext and increment the random number and communicate a request for storage of the incremented random number in database 110 as associated with the stored ciphertext.

At 408, an obscured copy of the ciphertext is returned. For example, rate limiting engine 130 can instruct storage engine 132 to relay the obscured copy to client 102.

Accordingly, whenever an attacker uploads the same data, the attacker will never know if a single copy exists because the server never reveals if it has a copy, or how many copies it may have. This obstruction is due to each ciphertext chunk having a different random number threshold after which the server indicates the ciphertext exists. On the attacker's side, the attacker conducting a brute force attack will see a random sequence of indications of whether the server has a copy, depending on the random number and threshold set for that ciphertext.

For example, a random number can be generated for a given ciphertext, with a random number 3 between 2-6 with a threshold of 6 at 402. The random number 4 is stored with the new ciphertext at 404. When the given ciphertext is uploaded again by a different client, the random number incremented to 5 at 406. The ciphertext is returned to the attacker as no copy. In a sequence of uploads of the given ciphertext, the attacker could see: negative (no copy; random number 4), negative (no copy; random number incremented to 5), negative (no copy; random number incremented to 6), positive (copy; random number incremented back to 1), negative (no copy; random number incremented to 6), negative (no copy; random number incremented to 2). Note, in embodiments, the random number is only incremented once per client. The above example therefore illustrates different clients uploading the same ciphertext.

Method 400 therefore stores only one copy, but when an attacker uploads, the attacker does not know where the copy is at in the threshold, because the attacker does not know the initial random number at initial storage. In this way, an attacker cannot brute force his way to discover the number of copies or data in the file.

Figure 8:
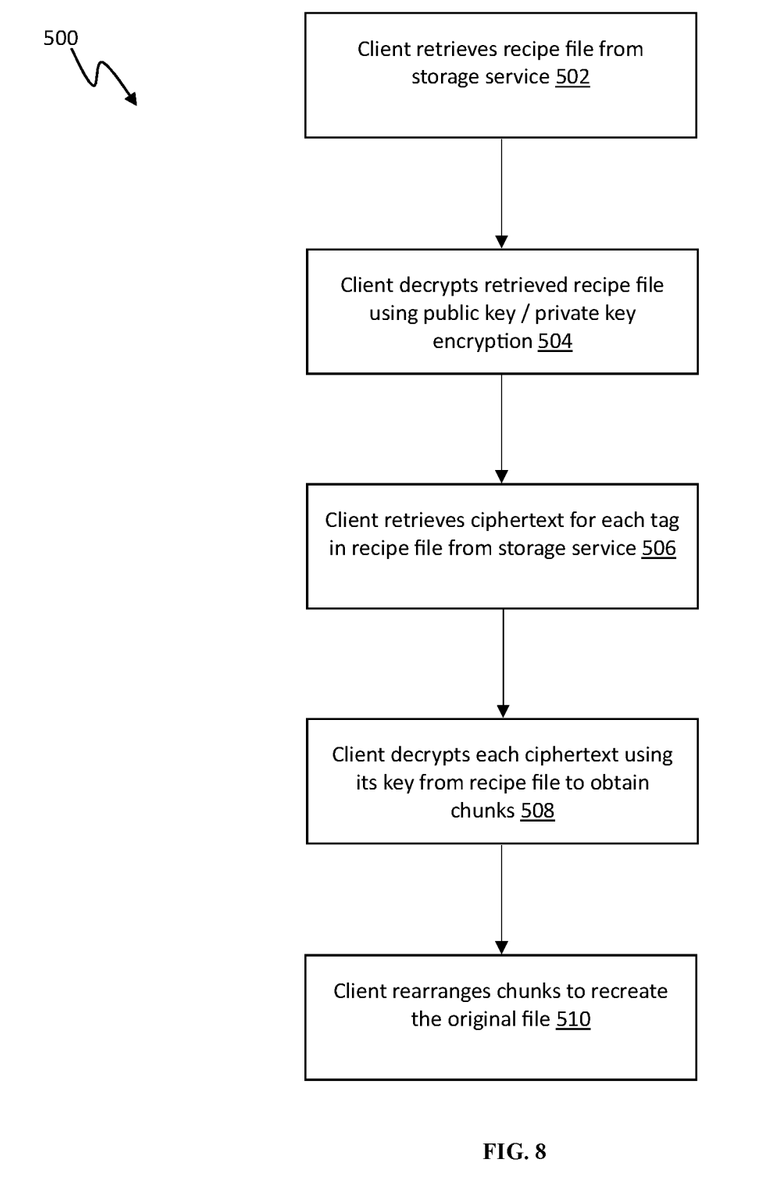
FIG. 8 is a flowchart of a method for retrieving deduplicated encrypted data, according to an embodiment.

Referring to FIG. 8, a flowchart of a method 500 for retrieving deduplicated encrypted data is depicted, according to an embodiment. Method 500 can be executed by components of system 100, as will be described, and is typically executed after a file has been stored as deduplicated on database 110, for example using methods 200, 400.

At 502, client 102 retrieves a recipe file (e.g. recipe file 300) from storage service 108. The recipe file corresponds to a data file that client 102 wishes to retrieve from database 110. In embodiments, the recipe file is encrypted using the client's public key/private key encryption.

At 504, client 102 decrypts the encrypted recipe file. For example, client 102 can decrypt the encrypted recipe file using the client's public key/private key encryption.

At 506, client 102 retrieves the ciphertext for each tag in the recipe file from storage service 108 (via database 110). For example, the recipe file includes a plurality of tags and a plurality of salted keys in a particular sequence. Client 102 stored the recipe file reflecting the sequence of chunks in order. Notably, storage service 108 is unaware of the order. Certain ciphertexts were stored as a part of the storage of the instant recipe file and certain others were already stored. Client 102 retrieves both already-stored (duplicate) and non-duplicate ciphertexts.

At 508, client 102 decrypts each ciphertext using the salted key from the recipe file to obtain all chunks for the data file.

At 510, client 102 rearranges the chunks in order according to the recipe file to recreate the original data file. Accordingly, method 500 allows for a chunked and deduplicated file stored as encrypted on database 110 to be recreated in plaintext.

The invention claimed is:

1. A method for secure deduplication of a file on a storage, the method comprising:
    dividing the file into a plurality of chunks;
    hashing each of the plurality of chunks to obtain a plurality of unsalted keys, wherein each one of the plurality of unsalted keys is associated with one of the plurality of chunks;
    salting the plurality of unsalted keys to generate a plurality of salted keys;
    encrypting each of the plurality of chunks with the plurality of salted keys to generate a plurality of ciphertexts;
    hashing each of the plurality of ciphertexts to generate a plurality of tags;
    validating that at least one of the plurality of ciphertexts is already present on the storage using the plurality of tags;
    verifying each tag in a subset of the plurality of tags that are not already present on the storage matches the corresponding ciphertext by hashing each of a subset of the plurality of ciphertexts that are not already present on the storage;
    when the verifying of a tag matching the corresponding ciphertext is successful, storing the subset of the plurality of tags that are not already present on the storage and the subset of the plurality of ciphertexts that are not already present on the storage;
    writing a recipe file to the storage as a sequence of tags and unencrypted salted keys;
    encrypting the recipe file using public key-private key encryption; and
    storing the encrypted recipe file on the storage.

2. The method of claim 1, further comprising:
    obscuring whether at least one of the subset of the plurality of ciphertexts is on the storage.

3. The method of claim 2, wherein the obscuring comprises:
    generating an initially random number for each of the subset of the plurality of ciphertexts, each initially random number being associated with a threshold; and
    storing the initially random number with each of the subset of the plurality of ciphertexts.

4. The method of claim 3, further comprising:
    determining if a certain ciphertext of one of the subset of the plurality of ciphertexts is uploaded by a potential attacker to the storage;
    incrementing the initially random number for the certain ciphertext; and
    wherein obscuring whether at least one of the subset of the plurality of ciphertexts comprises generating an obscured indication of whether the certain ciphertext is already stored based on the threshold.

5. The method of claim 1, wherein a client encrypting each of the plurality of chunks does not know the salting to generate the plurality of salted keys.

6. The method of claim 1, wherein the plurality of salted keys are generated by a program executing on a secure coprocessor.

7. The method of claim 1, further comprising: decrypting the encrypted recipe file using public key-private key encryption; retrieving the plurality of ciphertexts using the sequence of tags from the recipe file; decrypting the plurality of ciphertexts using the salted keys from the recipe file to obtain the plurality of chunks; and rearranging the plurality of chunks to recreate the file.

8. A system for secure deduplication of a file on a storage, the system comprising:
    a client device including at least one processor and memory operably coupled to the at least one processor, and instructions that, when executed on the at least one processor, cause the at least one processor to implement:
        a chunking engine configured to divide the file into a plurality of chunks,
        a hashing engine configured to hash each of the plurality of chunks to obtain a plurality of unsalted keys, wherein each one of the plurality of unsalted keys is associated with one of the plurality of chunks,
        an encryption engine configured to encrypt each of the plurality of chunks with a plurality of salted keys to generate a plurality of ciphertexts,
        wherein the hashing engine is further configured to hash each of the plurality of ciphertexts to generate a plurality of tags;
    a key server including a salting engine configured to salt the plurality of unsalted keys to generate the plurality of salted keys;
    a fingerprint index including a duplicate identification engine configured to validate that at least one of the plurality of ciphertexts is already present on the storage using the plurality of tags; and
    a storage service including:
        a ciphertext verification engine configured to verify each tag in the subset of the plurality of tags that are not already present on the storage matches the corresponding ciphertext by hashing each of the subset of the plurality of ciphertexts that are not already present on the storage, and
        a storage engine configured to store when the verifying of a tag matching the corresponding ciphertext is successful, the subset of the plurality of tags that are not already present on the storage and the subset of the plurality of ciphertexts that are not already present on the storage; and
    wherein the client device further includes an input/output engine configured to write a recipe file as a sequence of tags and unencrypted salted keys; and
    wherein the encryption engine is further configured to encrypt the recipe file using public key-private key encryption, and wherein the storage engine is further configured to store the encrypted recipe file on the storage.

9. The system of claim 8, further comprising a rate limiting engine configured to:
obscure whether at least one of the subset of the plurality of ciphertexts is on the storage.

10. The system of claim 9, wherein the rate limiting engine is configured to obscure whether at least one of the subset of the plurality of ciphertexts that are not already present on the storage is already on the storage including by:
generating an initially random number for each of the subset of the plurality of ciphertexts, each initially random number being associated with a threshold; and
storing the initially random number with each of the subset of the plurality of ciphertexts.

11. The system of claim 10, wherein the rate limiting engine is further configured to obscure whether at least one of the subset of the plurality of ciphertexts is on the storage including by:
determining if a certain ciphertext of one of the subset of the plurality of ciphertexts is uploaded by a potential attacker to the storage;
incrementing the initially random number for the certain ciphertext; and
returning an obscured indication of whether the certain ciphertext is already stored based on the threshold.

12. The system of claim 8, wherein the client device does not know the salting to generate the plurality of salted keys.

13. The system of claim 8, wherein the salting engine is configured to generate the plurality of salted keys by a program executing on a secure coprocessor.

14. The system of claim 8, wherein the encryption engine is further configured to: decrypt the encrypted recipe file using public key-private key encryption; retrieve the plurality of ciphertexts using the sequence of tags from the recipe file; decrypt the plurality of ciphertexts using the salted keys from the recipe file to obtain the plurality of chunks; and rearrange the plurality of chunks to recreate the file.

15. A non-transitory computer-readable medium comprising instructions that, when executed by a processor, cause the processor to implement:
dividing a file into a plurality of chunks;
hashing each of the plurality of chunks to obtain a plurality of unsalted keys, wherein each one of the plurality of unsalted keys is associated with one of the plurality of chunks;
salting the plurality of unsalted keys to generate a plurality of salted keys;
encrypting each of the plurality of chunks with the plurality of salted keys to generate a plurality of ciphertexts;
hashing each of the plurality of ciphertexts to generate a plurality of tags;
validating that at least one of the plurality of ciphertexts is already present on a storage using the plurality of tags;
verifying each tag in a subset of the plurality of tags that are not already present on the storage matches the corresponding ciphertext by hashing each of a subset of the plurality of ciphertexts that are not already present on the storage;
when the verifying of a tag matching the corresponding ciphertext is successful, storing the subset of the plurality of tags that are not already present on the storage and the subset of the plurality of ciphertexts that are not already present on the storage;
writing a recipe file to the storage as a sequence of tags and unencrypted salted keys;
encrypting the recipe file using public key-private key encryption; and
storing the encrypted recipe file on the storage.

16. The non-transitory computer-readable medium of claim 15, wherein the recipe file is a linear data structure, and wherein the sequence of tags and the plurality of unencrypted salted keys are stored in a sequence corresponding to an assembly order of the file.

17. The method of claim 1, further comprising:
when the verifying of a tag matching the corresponding ciphertext is successful, communicating an acknowledgement to a client requesting the file to be stored on the storage.

18. The method of claim 4, wherein the potential attacker does not know the initially random number.

19. The method of claim 4, wherein the initially random number is incremented per unique potential attacker.

20. The system of claim 11, wherein the potential attacker does not know the initially random number.

* * * * *